US007366296B2

(12) United States Patent
Benco et al.

(10) Patent No.: US 7,366,296 B2
(45) Date of Patent: Apr. 29, 2008

(54) NETWORK SUPPORT FOR VOICE PATH SIGNAL STRENGTH BALANCING

(75) Inventors: David S. Benco, Winfield, IL (US); Sanjeev Mahajan, Naperville, IL (US); Baoling S. Sheen, Naperville, IL (US); Sandra L. True, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 500 days.

(21) Appl. No.: 10/999,355

(22) Filed: Nov. 30, 2004

(65) Prior Publication Data

US 2006/0116119 A1 Jun. 1, 2006

(51) Int. Cl.
*H04M 3/00* (2006.01)
*H04M 9/00* (2006.01)

(52) U.S. Cl. ............................ 379/388.03; 379/388.05

(58) Field of Classification Search ........... 379/388.03, 379/388.05

See application file for complete search history.

(56) References Cited

U.S. PATENT DOCUMENTS 4,221,006 A * 9/1980 Weintraub et al. .......... 455/355
4,414,432 A * 11/1983 Skerlos et al. .............. 348/552
5,506,910 A * 4/1996 Miller et al. ................ 381/103
5,848,146 A * 12/1998 Slattery ................. 379/406.01
5,883,963 A * 3/1999 Tonella ........................ 381/104
5,933,486 A * 8/1999 Norby et al. .......... 379/221.09
6,195,438 B1 * 2/2001 Yumoto et al. ............. 381/103
6,961,567 B1 * 11/2005 Kuhn ...................... 455/435.1

* cited by examiner

*Primary Examiner*—Ramnandan Singh

(57) ABSTRACT

Embodiments of the method and system provide for automatic balancing of audio signal strength levels on voice paths between first and second parties in a telecommunication system. The method in an embodiment may have the steps of: checking for a subscription to audio signal strength level balancing by at least one of the first and second parties; and balancing, if at least one of the first and second parties has the subscription, audio signal strength levels on voice paths between the first and second parties. The system implements the method.

23 Claims, 4 Drawing Sheets

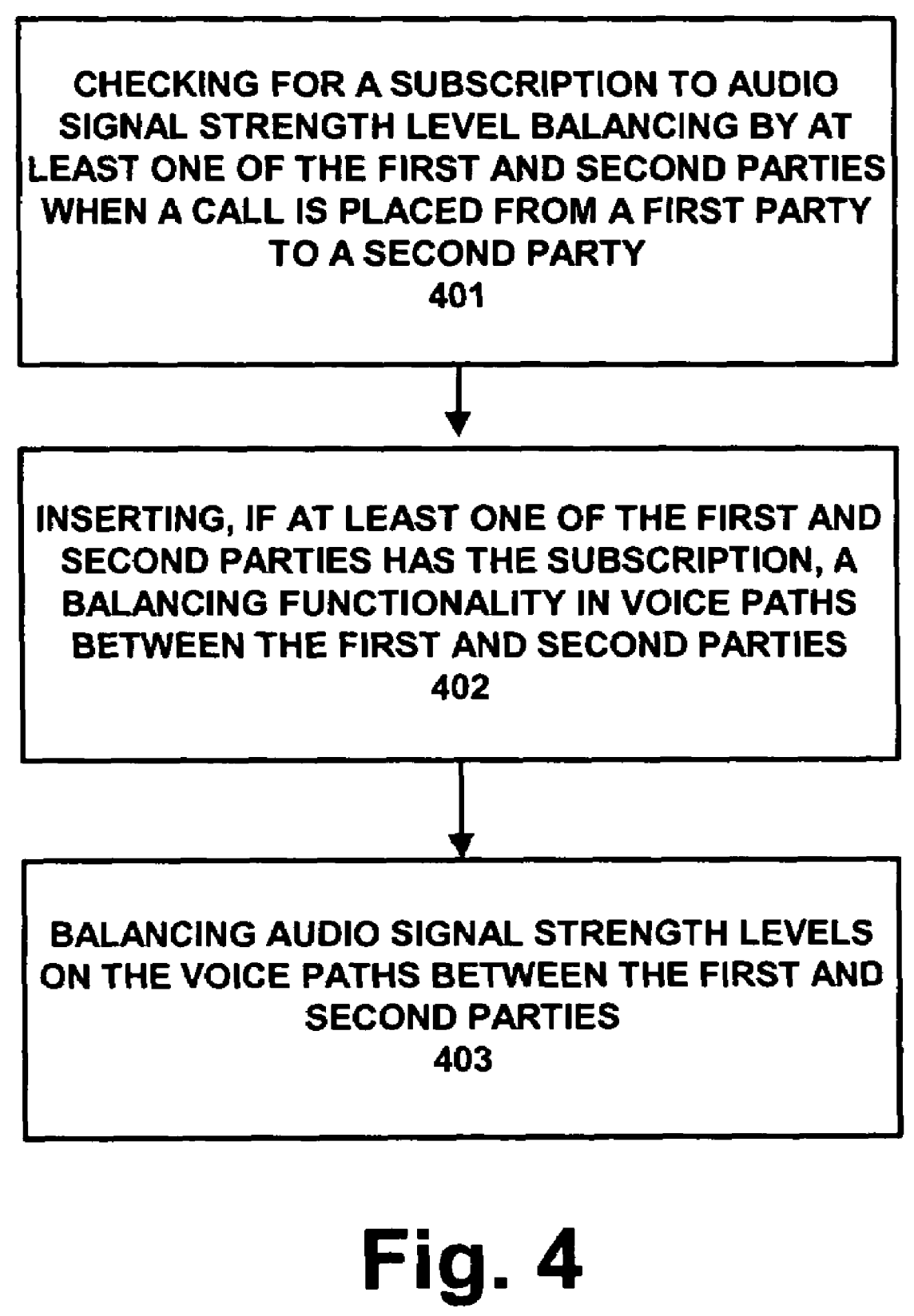

CHECKING FOR A SUBSCRIPTION TO AUDIO SIGNAL STRENGTH LEVEL BALANCING BY AT LEAST ONE OF THE FIRST AND SECOND PARTIES WHEN A CALL IS PLACED FROM A FIRST PARTY TO A SECOND PARTY
401

INSERTING, IF AT LEAST ONE OF THE FIRST AND SECOND PARTIES HAS THE SUBSCRIPTION, A BALANCING FUNCTIONALITY IN VOICE PATHS BETWEEN THE FIRST AND SECOND PARTIES
402

BALANCING AUDIO SIGNAL STRENGTH LEVELS ON THE VOICE PATHS BETWEEN THE FIRST AND SECOND PARTIES
403

Fig. 4

NETWORK SUPPORT FOR VOICE PATH SIGNAL STRENGTH BALANCING

TECHNICAL FIELD

The present invention relates in general to telephony, and, more particularly, to a method and system that automatically balances audio signal strength levels on voice paths between first and second parties in a telecommunication system.

BACKGROUND OF THE INVENTION

Quite often in telephone conversations the parties do not speak at the same volume, nor place the handset equally distant from their mouth, nor experience the same level of ambient noise, etc. These different conditions manifest themselves in the voice call where one party is perceived at a lower volume level than the other. Typically the recipient of the lower volume subconsciously raises his voice, which results in the lower-volume caller compensating by lowering her voice even further. It is quite frustrating to work through these adjustments by trial and error until a stable conversation is realized, and even then, the results are often far from optimal. Although some phones have a built-in volume control, many do not, and phone calls at either too high or too low volume due to different speaker loudness or poorly functioning telephone equipment can be very annoying.

Therefore, it is a drawback of the prior art that the audio signal strength (i.e., volume) of each both call paths cannot be automatically adjusted to a pre-defined "normal" level.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms, an embodiment of the present method is a method for automatic balancing of audio signal strength levels on voice paths between first and second parties in a telecommunication system. The method in this embodiment may have the steps of: checking for a subscription to audio signal strength level balancing by at least one of the first and second parties; and balancing, if at least one of the first and second parties has the subscription, audio signal strength levels on voice paths between the first and second parties.

Also, in general terms, an embodiment of the present system is a system that provides network support for automatic balancing of audio signal strength levels on voice paths between first and second parties in a telecommunication system. The system in this embodiment may have the following components: at least first and second voice paths in a system component of the telecommunication system between at least first and second parties to a call; only the first voice path of the first and second voice paths a having a balancing bridge; a feature check module operatively coupled to the at least first and second voice paths; a subscriber database operatively coupled to the feature check module; and at least one switching module operatively coupled to the at least first and second voice paths.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 4 illustrates another flow chart of logical operational steps that may be followed in accordance with one embodiment of the present method and system.

DETAILED DESCRIPTION

Figure 1:
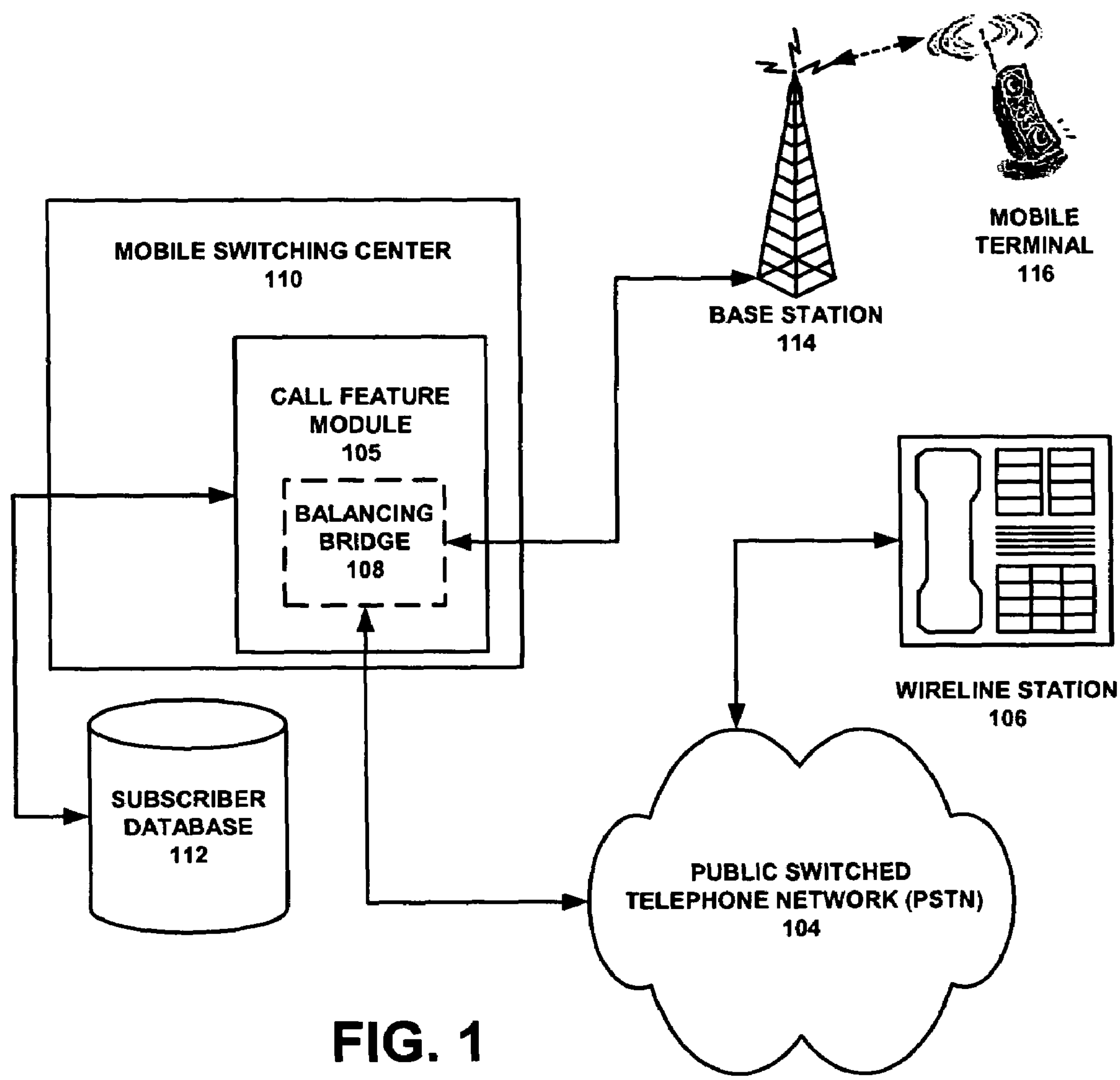
FIG. 1 depicts a block diagram illustrative of a telecommunication system for use with embodiments of the present method and system.

The particular values and configurations discussed in these non-limiting examples can be varied and are cited merely to illustrate an embodiment of the present invention and are not intended to limit the scope of the invention.

While wired telecommunication systems are widely used, mobile subscribers are becoming increasingly connected to their mobile handsets (also referred to as mobile terminals), which are often carried daily. Embodiments of the present method and system may provide network support to automatically balance audio signal strength levels on both incoming (listening) and outgoing (speaking) paths for a caller who is a subscriber. This support may be provided in wireline and wireless telecommunication systems, as well as, combinations of both such systems.

Typical wireless communication networks, such as those operating in accordance with the Code Division Multiple Access (CDMA) standard, generally have a plurality of radio base stations, which may be connected to a mobile switching center. Each base station covers a limited area, generally called a cell, within which a wireless communication link can be established with a mobile terminal such as a cell phone. A call in progress can be handed over from one base station to another while the mobile terminal is moving in the coverage area of the network.

Embodiments of the present method and system may automatically adjust the audio signal strength level (i.e., volume) of each of both call paths (of a call between callers) to a pre-defined "normal" level by boosting or attenuating each signal appropriately during the conversation. Embodiments of the present method and system may be used with both wireless and wireline voice calls.

One methodology for the telecommunications network may be to support automatic balancing of the volume of both sides of the conversation, depending upon whether the subscriber chooses to sign up for the feature.

The subscriber database may be checked for a subscription to audio signal strength level balancing by at least one of the first and second parties, and, if at least one of the first and second parties has the subscription, the balancing bridge may be switched into the voice paths such that the audio signal strength levels between the first and second parties are balanced.

The balancing bridge may be part of a system component of the telecommunication system. The telecommunication system may be at least one of a wireless system, a wireline system and a combination system having a wireless portion and a wired portion.

The system component may be a mobile switching center. The audio signal strength levels may be automatically balanced on both incoming (listening) and outgoing (speaking) voice paths of each of the first and second parties. That is, for example, the bridge balances an audio level of each side of a conversation between the first and second parties. The system automatically adjusts the audio signal strength level of each of the voice paths of each of the first and second parties to a predefined level by boosting or attenuating each voice signal during a conversation between the first and second parties.

In embodiments of the present method and system a telephone subscriber (first party) may dial another subscriber (second party). The subscriber database may be checked to determine whether either of the called or calling party has subscribed to the voice path balancing feature. However, if neither party has subscribed, the voice call is handled normally, that is as typically handled in the art.

FIG. 1 depicts a mobile switching center 110 coupled to a base station 114, which communicates with a mobile terminal 116. Although the present system and method may be used with any type of network (wireline and wireless, for example), many subscribers may be mobile subscribers who use mobile terminals (also referred to as mobile phone, a cell phone, mobile handset, or car phone). The switching center 110 may also be coupled to a public switched telephone network (PSTN) 104 that is coupled to wireline terminals, such as wireline station 106.

If either of a party using the mobile terminal 116 and a party using the wireline station 106 is a subscriber to the voice path signal strength balancing feature, then a balancing bridge 108 may be coupled into the voice path between the parties. The bridge 108 balances the audio level of each side of the conversation. The balancing bridge 108 may be contained in a call feature module 105 in a mobile switching center 110. The module may be implemented in hardware or software, and may be located in other components of the telecommunication system.

A subscriber database 112 may be coupled to the call feature module 105. The subscriber database 112 may contain data recording whether or not a calling party and/or a called party subscribe to the voice path signal strength balancing feature.

Figure 2:
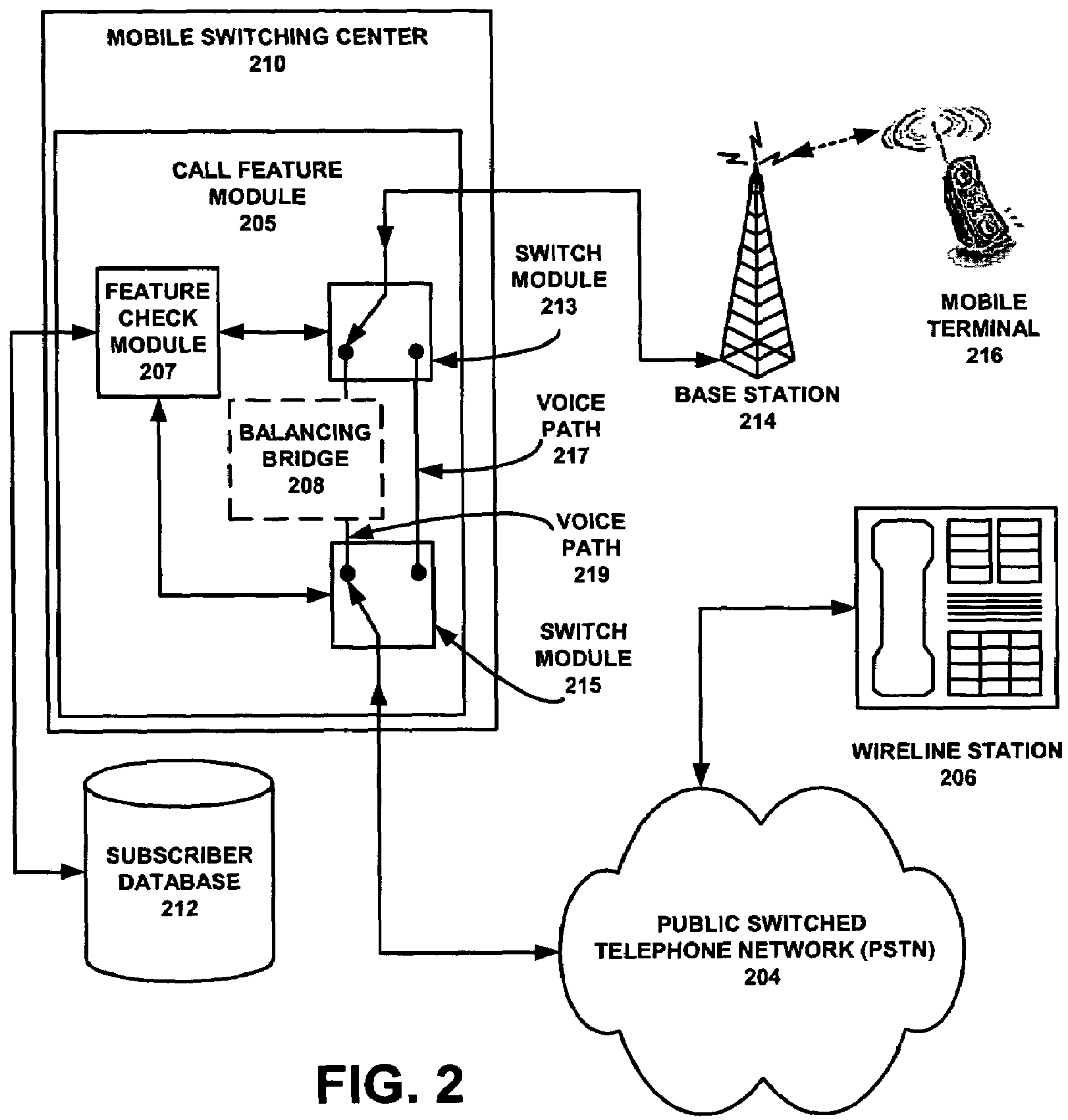
FIG. 2 illustrates a more detailed block diagram illustrative of a telecommunication system used with one embodiment of the present method and system.

FIG. 2 illustrates a more detailed block diagram illustrative of a mobile switching center 210 operatively coupled to base station 214 and mobile terminal 216 and to PSTN 204 and wireline station 206 for use by an embodiment of the present method and system. In this embodiment the mobile switching center 210 may have a call feature module 205 that has a feature check module 207, balancing bridge 208, switching modules 213 and 215. The feature check module 207 may be operatively coupled to subscriber database 212. The subscriber database 212 may have stored therein data regarding whether or not a party is a subscriber to the voice path signal strength balancing feature.

The call feature module 205 inserts the balancing bridge 208 into the voice path 219. The bridge 208 automatically adjust the audio signal strength level (i.e., volume) of each of both call paths (of a call between callers) to a pre-defined "normal" level by boosting or attenuating each signal appropriately during the conversation. If neither party is a subscriber to the feature then switch modules 213 and 215 switch the call onto voice path 217. FIG. 2 depicts only one embodiment that illustrates the present feature. Many other hardware and software implementations are possible.

Figure 3:
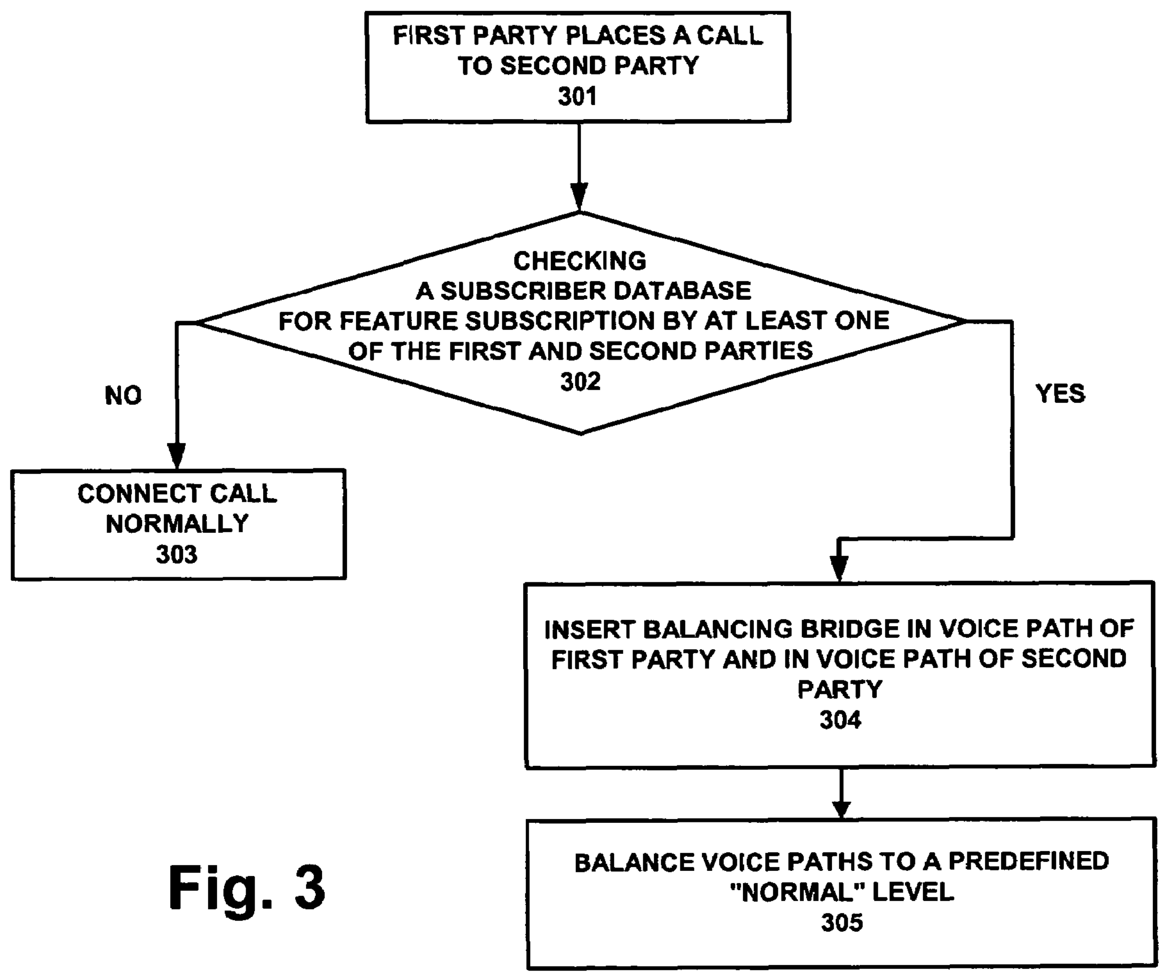
FIG. 3 illustrates a very general flow chart of logical operational steps that may be followed in accordance with one embodiment of the present method and system.

FIG. 3 is a general block diagram depicting an embodiment of the present method. In very general terms, the method may have the steps of: first party places a call to second party (301); checking a subscriber database for feature subscription by at least one of the first and second parties (302); connect normally if no subsubscription (303); insert balancing bridge in voice path of the first party and in voice path of the second party (304); and balance voice paths to a predefined "normal" level (305).

FIG. 4 is a block diagram depicting another embodiment of the present method for balancing audio signal strength levels on voice paths in a telecommunication system. This embodiment of the method may have the steps of: checking for a subscription to audio signal strength level balancing by at least one of the first and second parties when a call is placed from a first party to a second party (401); inserting, if at least one of the first and second parties has the subscription, a balancing functionality in voice paths between the first and second parties (402); and balancing audio signal strength levels on the voice paths between the first and second parties (403).

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for automatic balancing of audio signal strength levels on voice paths between first and second parties in a telecommunication system, the method comprising the steps of:

checking for a subscription to audio signal strength level balancing by at least one of the first and second parties; and balancing, if at least one of the first and second parties has the subscription, audio signal strength levels on voice paths between the first and second parties, wherein a balancing bridge implements the balancing, wherein the balancing bridge is inserted in only one of the voice paths between first and second parties, and wherein the bridge automatically adjusts an audio signal strength level of each of both voice paths to a pre-defined level by boosting or attenuating signals on each voice path during a conversation between the first and second parties.

2. The method of claim 1, wherein a balancing bridge implements the balancing.

3. The method of claim 2, wherein the balancing bridge is part of a system component of the telecommunication system, and wherein the telecommunication system is at least one of a wireless system, a wired system and a combination system having a wireless portion and a wired portion.

4. The method of claim 3, wherein the system component is a mobile switching center.

5. The method of claim 1, wherein the audio signal strength levels are automatically balanced on both incoming (listening) and outgoing (speaking) voice paths of each of the first and second parties.

6. The method of claim 1, wherein the bridge balances an audio level of each side of a conversation between the first and second parties.

7. The method of claim 1, wherein the method automatically adjusts the audio signal strength level of each of the voice paths of each of the first and second parties to a predefined level by boosting or attenuating each voice signal during a conversation between the first and second parties.

8. The method of claim 1, wherein a subscriber database is checked for the subscription.

9. A method for balancing audio signal strength levels on voice paths in a telecommunication system, the method comprising the steps of:

checking for a subscription to audio signal strength level balancing by at least one of the first and second parties when a call is placed from a first party to a second party;

inserting, if at least one of the first and second parties has the subscription, a balancing functionality in voice paths between the first and second parties; and balancing audio signal strength levels on the voice paths between the first and second parties, wherein a balancing bridge implements the balancing functionality, wherein the balancing bridge is inserted in only one of the voice paths between first and second parties, and wherein the bridge automatically adjusts an audio signal strength level of each of both voice paths to a pre-defined level by boosting or attenuating signals on each voice path during a conversation between the first and second parties.

10. The method of claim 9, wherein the balancing functionality is a balancing bridge.

11. The method of claim 9, wherein the balancing functionality is part of a system component of the telecommunication system, and wherein the telecommunication system is at least one of a wireless system, a wired system and a combination system having a wireless portion and a wired portion.

12. The method of claim 11, wherein the system component is a mobile switching center.

13. The method of claim 9, wherein the automatically balance the audio signal strength levels are automatically balanced on both the incoming (listening) and outgoing (speaking) voice paths of each of the first and second parties.

14. The method of claim 9, wherein the bridge balances an audio level of each side of a conversation between the first and second parties.

15. The method of claim 9, wherein the method automatically adjusts the audio signal strength level of each of the voice paths of each of the first and second parties to a predefined level by boosting or attenuating each voice signal during a conversation between the first and second parties.

16. The method of claim 9, wherein a subscriber database is checked for the subscription.

17. A system that provides network support for balancing audio signal strength levels on voice paths in a telecommunication system, comprising:

at least first and second voice paths in a system component of the telecommunication system between at least first and second parties to a call;

only the first voice path of the first and second voice paths a having a balancing bridge;

a feature check module operatively coupled to the at least first and second voice paths;

a subscriber database operatively coupled to the feature check module; and at least one switching module operatively coupled to the at least first and second voice paths;

wherein the balancing bridge implements balancing functionality, wherein the balancing bridge is inserted in only one of the voice paths, and wherein the bridge automatically adjusts an audio signal strength level of each of both voice paths to a pre-defined level by boosting or attenuating signals on each voice path during a conversation between first and second parties.

18. The system of claim 17, wherein the subscriber database is checked for a subscription to audio signal strength level balancing by at least one of the first and second parties, and, if at least one of the first and second parties has the subscription, the balancing bridge is switched into the voice paths such that the audio signal strength levels between the first and second parties are balanced.

19. The system of claim 17, wherein the balancing bridge is part of a system component of the telecommunication system, and wherein the telecommunication system is at least one of a wireless system, a wired system and a combination system having a wireless portion and a wired portion.

20. The system of claim 19, wherein the system component is a mobile switching center.

21. The system of claim 17, wherein the audio signal strength levels are automatically balanced on both incoming (listening) and outgoing (speaking) voice paths of each of the first and second parties.

22. The system of claim 17, wherein the bridge balances an audio level of each side of a conversation between the first and second parties.

23. The system of claim 17, wherein the system automatically adjusts the audio signal strength level of each of the voice paths of each of the first and second parties to a predefined level by boosting or attenuating each voice signal during a conversation between the first and second parties.

* * * * *